Nov. 10, 1931.   E. C. B. JAHN   1,831,119
SHOE BEARING
Filed Aug. 4, 1930   2 Sheets-Sheet 1

EMIL C. B. JAHN
INVENTOR

BY Herbert E. Smith
ATTORNEY

Nov. 10, 1931.　　　E. C. B. JAHN　　　1,831,119
SHOE BEARING
Filed Aug. 4, 1930　　　2 Sheets-Sheet 2

EMIL C. B. JAHN
INVENTOR

ATTORNEY

Patented Nov. 10, 1931

1,831,119

UNITED STATES PATENT OFFICE

EMIL C. B. JAHN, OF HARRINGTON, WASHINGTON, ASSIGNOR TO HARRINGTON MANUFACTURING COMPANY, OF HARRINGTON, WASHINGTON

SHOE BEARING

Application filed August 4, 1930. Serial No. 472,948.

My present invention relates to improvements in shoe bearings especially designed for use mounting the rotary cutting rod in rotary rod weeders. As is well known the angular rotary rod for cutting out weeds is mounted in horizontal position in the implement, and is drawn through the sub-soil, as the implement advances, and rotated for cutting out the weeds, and roots beneath the surface. The opposite ends of the rotary rod are mounted in shoes which glide through the soil, and great difficulty has heretofore been encountered in equipping the implement with shoes that can glide or slide freely through the soil. Usually the bearings of the rod mounting fill up with dirt and weeds, especially when the soil has a clay content, and frequently the material is packed in the bearings in such manner as to prevent the rotation of the rod.

By the utilization of the shoe bearing or mount for the rotary rod according to my invention, exposed and unnecessary bearing surfaces are eliminated, and at the same time the rod is mounted or journaled, through its spools, in such manner as to insure freedom of rotation of the rod, and the bearing is so constructed as to readily free itself of dirt and weeds and thus prevent the bearing from becoming packed.

The invention consists in certain novel combinations and arrangements in the rod mount, including the shoe, spool and a removable bearing block, as will hereinafter be more fully set forth and claimed. In the accompanying drawings I have illustrated one complete example of the physical embodiment of my invention wherein the parts are combined and arranged according to the best mode I have thus far devised for the practical application of the principles of my invention.

Figure 1:
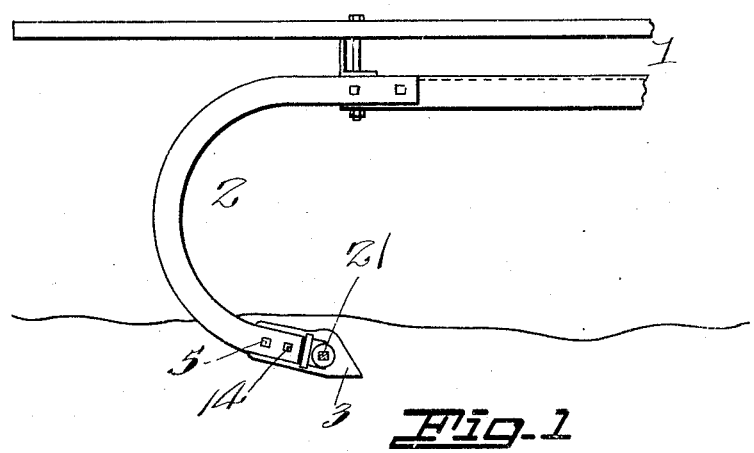
Figure 1 is a view in elevation of so much of a rotary rod weeder as is necessary to illustrate my invention, the rotary rod being shown in section and in position below the surface of the soil for operation.
Figure 2:
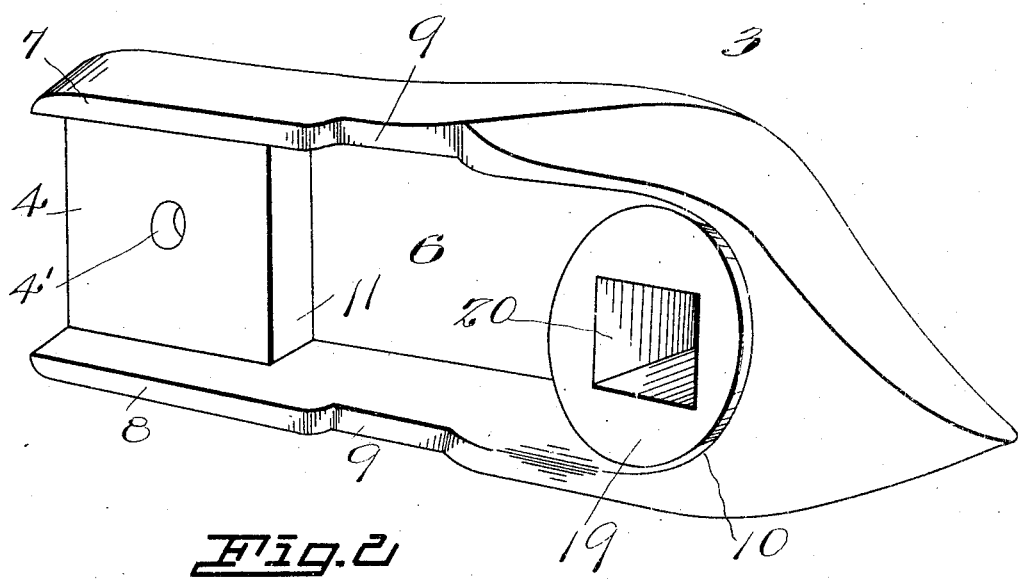
Figure 2 is a perspective view of the bearing shoe showing also a bearing spool therein.

In Figure 1 where the relation of parts is illustrated, the implement is designated as 1, and the gooseneck or U-shaped beam 2 is rigidly secured to the frame, with the bearing shoe secured at the end of the beam, and the position of the rotary rod and shoes is indicated as below the surface of the soil for operation of the rotary cutting rod or weeder rod, 21, hereinafter referred to.

The shoe is of metal and provided with an upright attaching block 4 having a bolt hole 4' for the bolt 5 that rigidly secures the shoe to the beam, and between this block 4 and the toe or front of the shoe, an open space 6 is provided for the reception of the bearing block. Along its upper and lower edges the shoe is fashioned with laterally projecting flanges 7 and 8, and these flanges, forward of the attaching block, are notched as at 9, 9.

Figure 5:
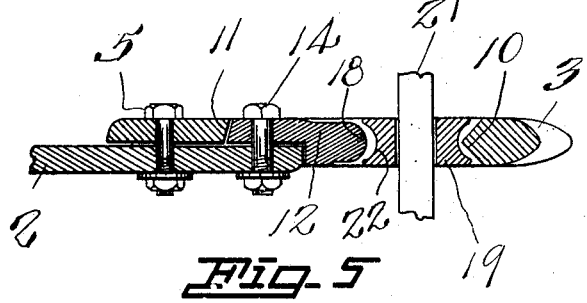
Figure 5 is a sectional view at line 5—5 of Figure 4.
Figure 6:
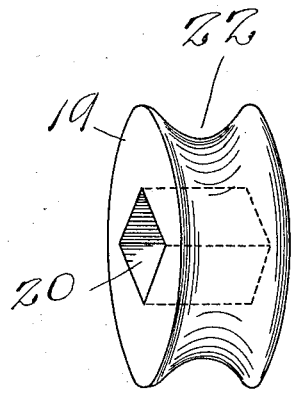
Figure 6 is a perspective view of the bearing spool.

The inner front wall of the opening 6, as at 10, is semi-circular and fashioned with an arcuate, angular, edge as indicated best in Figure 5, while the rear wall 11 of the opening is flat and preferably slightly beveled, to form a shoulder or abutment for the bearing block 12.

Figure 3:
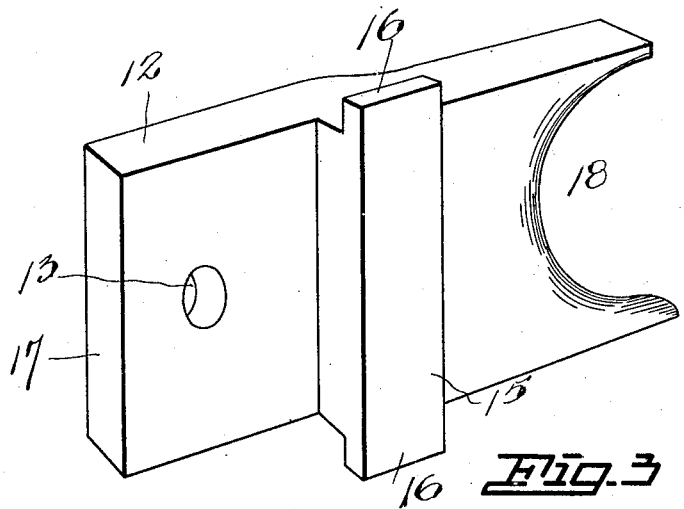
Figure 3 is a perspective view of the removable bearing block.
Figure 4:
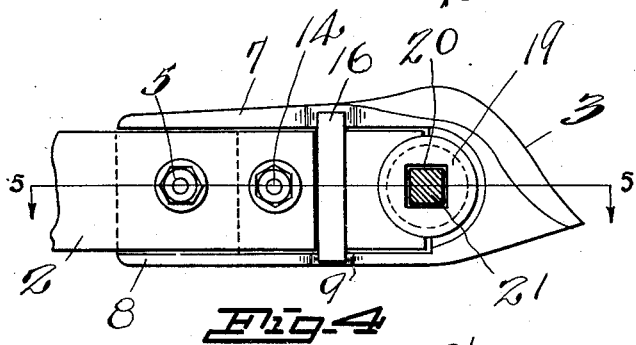
Figure 4 is a view in elevation with the rotary rod in section, showing the mounting for the rod.

As seen in Figure 3 the bearing block is fashioned with a bolt hole 13, and a bolt 14 is passed through this hole and a hole in the end of the U-beam or gooseneck 2 for securing the block to the beam, and the bearing block has an upright rib 15 that forms an abutment for the front end of the beam as indicated. The bearing block occupies the space 6 of the shoe, and the block forms a rigid extension of the beam 2. At the upper and lower ends of the upright rib are formed lugs 16 that fit neatly into the notches 9 of the shoe flanges, and the rear flat edge 17 of the block abuts against the face of edge 11 of the shoe. Thus the block is braced against the shoe and against the beam 2, and the two bolts 5 and 14 serve to hold the block as a rigid extension of the lower end of the U-beam or gooseneck.

At its forward end the block is fashioned with a rounded edge 18 of semi-circular shape, and this edge, with the wall 10 of the shoe, forms the circular bearing or enclosure for the bearing spool 19.

The spool is in the form of a circular disk with a square, central, hole 20 for the reception of the square rotary rod 21, and the spool is fashioned with an annular groove 22 in its periphery, having a semi-circular cross section. As best seen in Figure 5, the spool is mounted and retained in the circular opening formed by the complementary walls 10 and 18 of the shoe and block, and of course the shoe rotates or revolves with the rotary weed-cutter or angular rod 21.

The rounded face or edge 18 of the block fits snugly into the annular groove of the spool, and the angular arcuate, or semi-circular angular face or edge 10 also fits neatly into the groove, to form an annular bearing for the spool with the rounded bearing edge 18 taking the thrust imparted laterally against the rod, as it advances through the soil. Due to the friction, at the rear of the spool, against the bearing edge 18, accumulation of dirt or weeds in that part of the bearing is prevented, and the spool is thus permitted to run or turn freely in its bearings.

In front of the spool, the angular, arcuate edge 10 presents flat faces to the annular grooves of the spool, and these flat faces, being out of frictional contact with the spool provide for a self cleaning effect, and disposal of soil and weeds that might otherwise collect in front of the spool.

The non-frictional engagement or bearing at the front of the annularly grooved spool with the angular or double-beveled edge 10 of the shoe, permits of a slight tilting or wobbling of the spool to compensate for passage of the rod through rough or uneven soil, and absorb strains that would otherwise be imparted to the bearing for the spool. This weaving or tilting motion of the spool in its bearing also tends to loosen and remove any soil or weeds that might lodge in the bearing.

If and when repairs or adjustments are necessary, the bearing block may with facility be removed after the bolt 14 is detached, after which the spool may be freed from its bearing for desired purposes, and the parts may again be assembled with equal facility.

Having thus fully described my invention, what I claim as new and desire to secure by Letters Patent is:—

1. The combination with an open shoe having lateral notched flanges, of a bearing block having lugs in said notched flanges, a beam and means for bolting the beam to said shoe and block, a rotary spool having an annular peripheral groove, said block having a semi-circular rounded bearing edge for the spool, and said shoe having an arcuate retaining edge and opposed angular flat faces for said retaining edge complementary to the groove of the spool.

2. In a shoe-bearing for a rotary rod weeder, the combination with a shoe having an opening and an arcuate, angular edge for said opening, of a bearing block having a curved convex bearing edge opposite the arcuate angular edge, a bearing spool mounted between the two edges, and said spool having an annular peripheral groove for co-action with said edges.

In testimony whereof I affix my signature.
EMIL C. B. JAHN.